United States Patent
Faigle et al.

Patent Number: 5,460,405
Date of Patent: Oct. 24, 1995

[54] APPARATUS FOR INFLATING AN INFLATABLE VEHICLE OCCUPANT RESTRAINT

[75] Inventors: Ernst M. Faigle, Dryden; John H. Semchena, Royal Oak; Richard J. Thompson, Imlay City, all of Mich.

[73] Assignee: TRW Vehicle Safety Systems Inc., Lyndhurst, Ohio

[21] Appl. No.: 267,275

[22] Filed: Jun. 28, 1994

[51] Int. Cl.$^6$ .................................................. B60R 21/26
[52] U.S. Cl. ............................................ 280/735; 280/741
[58] Field of Search ........................... 307/10.1; 340/436, 340/438; 280/735, 728 R, 730, 736, 741

[56] References Cited

U.S. PATENT DOCUMENTS

| | | | |
|---|---|---|---|
| 3,724,870 | 4/1973 | Kurokawa | 280/741 |
| 3,767,228 | 10/1973 | Lewis | 280/735 |
| 3,773,352 | 11/1973 | Radke | 280/741 |
| 3,910,595 | 10/1975 | Katter | 280/732 |
| 3,972,545 | 8/1976 | Kirchoff et al. | 280/735 |
| 5,009,855 | 4/1991 | Nilsson | 280/741 |
| 5,058,921 | 10/1991 | Cuevas | 280/741 |
| 5,071,160 | 12/1991 | White et al. | 280/735 |
| 5,074,583 | 12/1991 | Fujita et al. | 280/735 |
| 5,098,123 | 3/1992 | Jones | 280/741 |
| 5,310,214 | 5/1994 | Cuevas | 280/736 |
| 5,320,382 | 6/1994 | Goldstein | 280/735 |
| 5,330,226 | 7/1994 | Gentry | 280/735 |
| 5,400,487 | 3/1995 | Gioutsos et al. | 280/735 |

FOREIGN PATENT DOCUMENTS 0382552  8/1990  European Pat. Off. .

Primary Examiner—Karin L. Tyson
Attorney, Agent, or Firm—Tarolli, Sundheim & Covell

[57] ABSTRACT

An apparatus (10) for inflating an inflatable vehicle occupant restraint (12) includes a collision sensor (52) and an inflator assembly (20). The collision sensor (52) provides a collision signal indicating the occurrence of a vehicle collision. The inflator assembly (20) includes a first source (22) of inflation fluid which, when actuated, provides a first volume of inflation fluid. The inflator assembly (20) further includes a second source (24) of inflation fluid which, when actuated, provides a second volume of inflation fluid which differs from the first volume. A position sensor (70) provides a position signal indicating a position of an occupant of the vehicle. A controller (50) actuates the first and second sources (22, 24) of inflation fluid in any one of a plurality of differing modes of operation in response to the collision signal and the position signal.

14 Claims, 1 Drawing Sheet

APPARATUS FOR INFLATING AN INFLATABLE VEHICLE OCCUPANT RESTRAINT

FIELD OF THE INVENTION

The present invention relates to an apparatus for inflating an inflatable vehicle occupant restraint such as an air bag.

BACKGROUND OF THE INVENTION

An apparatus for inflating an inflatable vehicle occupant restraint, such as an air bag, includes an inflator which comprises a source of inflation fluid for inflating the air bag. The source of inflation fluid may include, for example, an ignitable gas generating material which generates a large volume of gas when ignited. When the vehicle experiences deceleration of at least a predetermined amount which indicates the occurrence of a vehicle collision, the gas generating material is ignited. The gas which is then generated upon combustion of the gas generating material is directed to flow from the inflator into the air bag to inflate the air bag. When the air bag is inflated, it extends into the vehicle occupant compartment to restrain an occupant of the vehicle from forcefully striking parts of the vehicle.

It is sometimes desirable to control the inflation of the air bag in response to various conditions. For example, it may be desirable to control the inflation of the air bag in response to the position of a vehicle occupant to be restrained by the air bag. It may also be desirable to control the inflation of the air bag in response to the ambient temperature.

SUMMARY OF THE INVENTION

In accordance with the present invention, an apparatus for inflating an inflatable vehicle occupant restraint, such as an air bag, comprises a collision sensor means and an inflator means. The collision sensor means provides a collision signal indicating the occurrence of a vehicle collision. The inflator means provides inflation fluid for inflating the vehicle occupant restraint. The inflator means includes a first source of inflation fluid which, when actuated, provides a first volume of inflation fluid. The inflator means further includes a second source of inflation fluid which, when actuated, provides a second volume of inflation fluid which differs from the first volume.

The apparatus further comprises a position sensor means and a controller means. The position sensor means provides a position signal indicating a position of an occupant of the vehicle. The controller means actuates the first and second sources of inflation fluid in any one of a plurality of differing modes of operation in response to the collision signal and the position signal.

In a preferred embodiment of the present invention, the differing modes of operation include a mode in which both the first and second sources of inflation fluid are actuated, as well as modes in which either of the first and second sources is not actuated. The modes of operation further include modes in which the first and second sources of inflation fluid are actuated either simultaneously or sequentially. Since the first and second volumes of inflation fluid provided by the first and second sources differ from each other, each mode of operation will inflate the vehicle occupant restraint in a manner that differs accordingly.

The modes of operation are predetermined with reference to various positions of a vehicle occupant to be restrained by the vehicle occupant restraint. The controller means selects the predetermined mode of operation that corresponds to the position indicated by the position signal. The controller means thus actuates the sources of inflation fluid in a mode of operation that inflates the restraint in a manner that is desirable with reference to the position of the vehicle occupant.

The preferred embodiment of the present invention further comprises a temperature sensor means for providing a temperature signal indicating the ambient temperature of the inflator means. The controller means selects one of the differing modes of operation in response to the temperature signal as well as the position signal. In this manner, the controller means selects a mode of operation for the first and second sources of inflation fluid which is predetermined to correspond with the conditions indicated by both the temperature signal and the position signal.

BRIEF DESCRIPTION OF THE DRAWINGS

The foregoing and other features of the present invention will become apparent to those skilled in the art to which the present invention relates upon reading the following description of the invention with reference to the accompanying drawings, in which.

DESCRIPTION OF A PREFERRED EMBODIMENT

Figure 1:
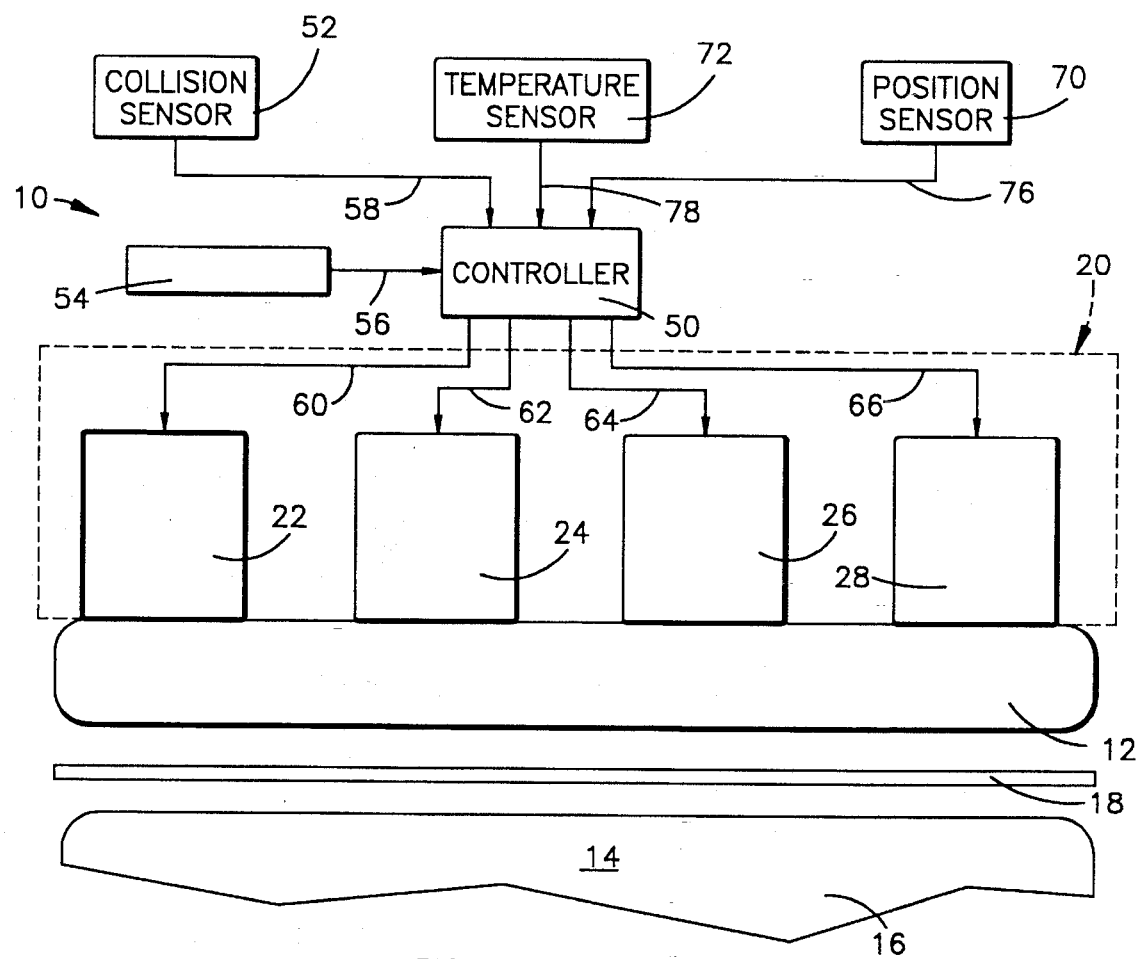
FIG. 1 is a schematic view of a vehicle occupant restraint system comprising a preferred embodiment of the present invention.

A vehicle occupant restraint system 10 comprising a preferred embodiment of the present invention is shown schematically in FIG. 1. The vehicle occupant restraint system 10 includes an inflatable vehicle occupant restraint 12, commonly referred to as an air bag, for restraining movement of a vehicle occupant upon the occurrence of a vehicle collision. The air bag 12 is stored in the vehicle at a location adjacent to the vehicle occupant compartment 14. If the air bag 12 is to restrain forward movement of a vehicle occupant upon the occurrence of a front impact collision, it is stored adjacent to the front of the vehicle occupant compartment 14, such as in the steering wheel of the vehicle or in the instrument panel of the vehicle. If the air bag 12 is to restrain movement of the vehicle occupant toward a side of the vehicle upon the occurrence of a side impact collision, it is stored adjacent to the side of the vehicle occupant compartment 14, such as in a side door of the vehicle.

When the vehicle experiences at least a predetermined amount of deceleration which indicates the occurrence of a collision, the air bag 12 is inflated from the stored condition of FIG. 1 to an inflated condition. When the air bag is in the inflated condition, it extends into the vehicle occupant compartment 14 to restrain movement of an occupant of an adjacent vehicle seat 16. A cover 18 conceals the air bag 12 from the vehicle occupant compartment 14 when the air bag 12 is in the stored condition, and opens when the air bag 12 is inflated from the stored condition to the inflated condition.

Figure 2:
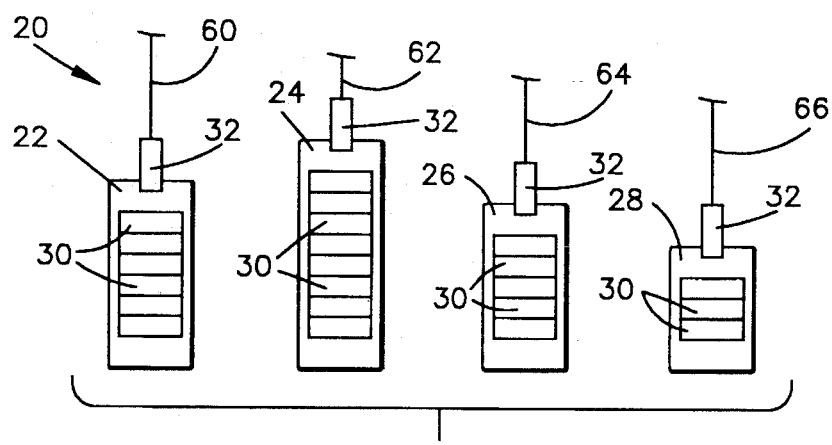
FIG. 2 is a schematic view of parts of the system of FIG. 1.

The vehicle occupant restraint system 10 also includes an inflator assembly 20 which provides inflation fluid for inflating the air bag 12. The inflator assembly 20 includes a plurality of sources of inflation fluid which are actuatable separately from each other. In the preferred embodiment of the present invention shown in the drawings, the inflator assembly 20 includes four sources 22, 24, 26 and 28 of inflation fluid which are actuatable separately from each other. As shown in FIG. 2, each of the four sources 22–28 of inflation fluid comprises a plurality of grains 30 of ignitable gas generating material. The material of which the grains 30 are formed produces a large volume of gas when ignited, and may have any suitable composition known in the art. Each of the four sources 22–28 of inflation fluid further comprises a respective squib 32 which, when actuated, emits products of combustion that ignite the respective grains 30 of gas generating material. Such squibs also are known in the art.

Moreover, the inflator assembly 20 includes at least two sources of inflation fluid that provide respective volumes of inflation fluid which differ from each other. In the preferred embodiment of the present invention shown in the drawings, each of the four sources 22–28 of inflation fluid provides a respective volume of gas which differs from each other respective volume of gas. Accordingly, the number of grains 30 of gas generating material in each one of the four sources 22–28 of inflation fluid is different from the number of grains 30 in each other one of the four sources 22–28.

The vehicle occupant restraint system 10 further includes an electronic controller 50 and a collision sensor 52. The controller 50 preferably comprises a microprocessor of known construction, and is connected with a suitable power source 54 through a line 56. If the air bag 12 is stored at the front of the vehicle, as described above with reference to a front impact collision, the collision sensor 52 preferably comprises a deceleration sensor which senses a predetermined amount of vehicle deceleration. The predetermined amount of vehicle deceleration is an amount which indicates the occurrence of a front impact collision for which inflation of the air bag 12 is required to restrain an occupant of the seat 16. If the air bag 12 is stored at the side of the vehicle, as described above with reference to a side impact collision, the collision sensor 52 preferably comprises an acceleration sensor or a crush sensor. Such a collision sensor senses either an acceleration or a crush condition which is predetermined to indicate the occurrence of a side impact to the vehicle requiring inflation of the air bag 12. When the collision sensor 52 senses the vehicle condition that is predetermined to indicate the occurrence of a collision requiring inflation of the air bag 12, it provides a collision signal to the controller 50 on a line 58. The controller 50 responds to the collision signal by actuating one or more of the sources 22–28 of inflation fluid.

Specifically, the controller 50 communicates with the first source 22 through a first actuator line 60, and separately communicates with each of the second, third and fourth sources 24, 26 and 28 through second, third and fourth actuator lines 62, 64 and 66, respectively. When the first source 22 of inflation fluid is to be actuated, the controller 50 provides a first actuation signal to the first source 22 on the first actuator line 60. The squib 32 (FIG. 2) in the first source 22 is then actuated. As a result, the grains 30 of gas generating material in the first source 22 are ignited and together generate a first volume of gas for inflating the air bag 12. Each of the second, third, and fourth sources 24, 26 and 28 of inflation fluid is actuatable in the same manner by a second, third or fourth actuation signal respectively provided by the controller 50 on the second, third or fourth actuator line 62, 64 or 66. Second, third or fourth volumes of gas are then generated accordingly.

The controller 50 may actuate any number of the four sources 22–28 of inflation fluid in response to the collision signal received from the deceleration sensor 52. The controller 50 may also actuate any number of the four sources 22–28 of inflation fluid either simultaneously or in sequence. The controller 50 may thus actuate the sources 22–28 of inflation fluid in any one of a plurality of modes of operation which differ from each other in the number and/or the timing of the sources 22–28 being actuated. The volumes of inflation fluid that are provided in the differing modes of operation will differ accordingly. The mode in which the sources 22–28 of inflation fluid are actuated by the controller 50 is determined by the controller 50 in response to signals received from a position sensor 70 and a temperature sensor 72.

The position sensor 70 senses the position of the seat 16 relative to the part of the vehicle in which the air bag 12 is stored, and provides a position signal to the controller 50 on a line 76. The position of the seat 16 affects the position of an occupant of the seat 16 relative to the air bag 12. Therefore, the position signal provided to the controller 50 by the position sensor 70 indicates the position of an occupant of the seat 16 relative to the air bag 12. If the position of the occupant of the seat 16 is indicated to be relatively close to the air bag 12, it may be desirable to inflate the air bag 12 relatively slowly and/or to a relatively small inflated volume, i.e., to provide a relatively "soft" inflation of the air bag 12. This can be accomplished by actuating less than all of the four sources 22–28 of inflation fluid and/or by actuating a number of the sources 22–28 sequentially rather than simultaneously. Therefore, the controller 50 operates in response to the position signal received from the position sensor 70 by providing actuation signals on the first, second, third and/or fourth actuator lines 60–66 in such a manner as to actuate a desired number of the sources 22–28 of inflation fluid at desired times. The controller 50 thus operates in response to the position signal received from the position sensor 70 so as to actuate the sources 22–28 of inflation fluid in a mode of operation that inflates the air bag 12 in a manner that is desirable with reference to the position of an occupant of the seat 16.

Although the position sensor 70 in the preferred embodiment of the present invention senses the position of the seat 16 relative to the part of the vehicle in which the air bag 12 is stored, the system 10 may include an alternative position sensor that senses the position of an occupant of the seat. The position signal provided by such an alternative position sensor would indicate the occupant's position directly, rather than indicating the occupant's position indirectly in terms of the position of the seat 16. In either case, the position sensor 70 may comprise any suitable structure known in the art.

The temperature sensor 72, which also may comprise any suitable structure known in the art, senses the ambient temperature at the inflator assembly 20, and provides a temperature signal to the controller 50 on a line 78. The ambient temperature at the inflator assembly 20 affects the rate at which the grains 30 of gas generating material will burn and generate gas for inflating the air bag 12. The ambient temperature is very low, it may be desirable to actuate all of the sources 22–28 of inflation fluid to ensure that a sufficient volume of gas will be generated in the time required for inflation of the air bag 12. Alternatively, if the ambient temperature is very high, it may be desirable to actuate only one of the sources 22–28 of inflation fluid, because one of the sources 22–28 alone may provide the required volume of gas as a result of a more rapid combustion of the grains 30 which may occur at the higher ambient temperature. The controller 50 operates in response to the temperature signal received from the temperature sensor 72 by providing actuation signals on the first, second, third and/or fourth actuator lines 60–66 in such a manner as to actuate a desired number of the sources 22–28 of inflation fluid, either sequentially or simultaneously. The controller 50 thus operates in response to the temperature signal received from the temperature sensor 70 so as to actuate the sources 22–28 of inflation fluid in a mode of operation that inflates the air bag 12 efficiently at the particular ambient temperature of the inflator assembly 20.

In the foregoing manner, the controller 50 determines the number and timing of the actuation signals to be provided to the four sources 22–28 of inflation fluid with reference to both the ambient temperature and the position of an occupant of the seat 16. The controller 50 preferably makes that determination by comparing the temperature signal received from the temperature sensor 72 with empirically predetermined temperature data, by comparing the position signal received from the position sensor 70 with empirically predetermined position data, and by selecting a mode of operation which comprises a predetermined number and a predetermined timing of actuation signals corresponding with the conditions indicated by the temperature and position signals.

From the above description of the invention, those skilled in the art will perceive improvements, changes and modifications. For example, the inflator assembly 20 could include a greater or lesser number of sources of inflation fluid, with the number of differing volumes of inflation fluid being determined accordingly. The inflator assembly 20 could also include different types of sources of inflation fluid, such as hybrid or augmented inflators having containers of pressurized inflation fluid. Such improvements, changes and modifications within the skill of the art are intended to be covered by the appended claims.

Having described the invention, the following is claimed:

1. Apparatus for inflating an inflatable vehicle occupant restraint such as an air bag, said apparatus comprising:

collision sensor means for providing a collision signal indicating the occurrence of a vehicle collision;

inflator means for providing inflation fluid for inflating the vehicle occupant restraint, said inflator means including a first source of inflation fluid which, when actuated, provides a first volume of inflation fluid, said inflator means further including a second source of inflation fluid which, when actuated, provides a second volume of inflation fluid which differs from said first volume;

position sensor means for providing a position signal indicating a position of an occupant of the vehicle; and controller means for actuating said first and second sources of inflation fluid in any one of a plurality of differing modes of operation in response to said collision signal and said position signal, said differing modes of operation including a mode in which both said first and second sources of inflation fluid are actuated and further including a mode in which said second source of inflation fluid is not actuated.

2. Apparatus as defined in claim 1 wherein said modes of operation include a mode in which said first and second sources of inflation fluid are actuated simultaneously, and further include a mode in which said first and second sources of inflation fluid are actuated sequentially.

3. Apparatus as defined in claim 1 wherein said first source of inflation fluid includes a plurality of grains of ignitable gas generating material which, when ignited, generates gas for inflating the vehicle occupant restraint, said second source of inflation fluid also including a plurality of grains of said gas generating material, the number of grains of said gas generating material included in said second source of inflation fluid differing from the number of grains of said generating material included in said first source of inflation fluid.

4. Apparatus as defined in claim 1 wherein said first and second sources of inflation fluid are included in a larger plurality of sources of inflation fluid, each of said sources of inflation fluid, when actuated, providing a respective volume of inflation fluid which differs from each other respective volume of inflation fluid.

5. Apparatus for inflating an inflatable vehicle occupant restraint such as an air bag, said apparatus comprising:

collision sensor means for providing a collision signal indicating the occurrence of a vehicle collision;

inflator means for providing inflation fluid for inflating the vehicle occupant restraint, said inflator means including a first source of inflation fluid which, when actuated, provides a first volume of inflation fluid, said inflator means further including a second source of inflation fluid which, when actuated, provides a second volume of inflation fluid which differs from said first volume;

temperature sensor means for providing a temperature signal indicating the ambient temperature at said inflator means; and controller means for actuating said first and second sources of inflation fluid in any one of a plurality of differing modes of operation in response to said collision signal and said temperature signal, said differing modes of operation including a mode in which both said first and second sources of inflation fluid are actuated and further including a mode in which said second source of inflation fluid is not actuated.

6. Apparatus as defined in claim 5 wherein said modes of operation include a mode in which said first and second sources of inflation fluid are actuated simultaneously, and further include a mode in which said first and second sources of inflation fluid are actuated sequentially.

7. Apparatus as defined in claim 5 wherein said first source of inflation fluid includes a plurality of grains of ignitable gas generating material which, when ignited, generates gas for inflating the vehicle occupant restraint, said second source of inflation fluid also including a plurality of grains of said gas generating material, the number of grains of said gas generating material included in said second source of inflation fluid differing from the number of grains of said generating material included in said first source of inflation fluid.

8. Apparatus as defined in claim 5 wherein said first and second sources of inflation fluid are included in a larger plurality of sources of inflation fluid, each of said sources of inflation fluid, when actuated, providing a respective volume of inflation fluid which differs from each other respective volume of inflation fluid.

9. Apparatus for inflating an inflatable vehicle occupant restraint such as an air bag, said apparatus comprising:

collision sensor means for providing a collision signal indicating the occurrence of a vehicle collision;

inflator means for providing inflation fluid for inflating the vehicle occupant restraint, said inflator means including a first source of inflation fluid which, when actuated, provides a first volume of inflation fluid, said inflator means further including a second source of inflation fluid which, when actuated, provides a second volume of inflation fluid which differs from said first volume;

position sensor means for providing a position signal indicating a position of an occupant of the vehicle;

temperature sensor means for providing a temperature signal indicating the ambient temperature of said inflator means; and controller means for actuating said first and second sources of inflation fluid in any one of a plurality of differing modes of operation in response to said collision signal, said position signal and said temperature signal, said differing modes of operation including a mode in which both said first and second sources of inflation fluid are actuated and further including a mode in which said second source of inflation fluid is not actuated.

10. Apparatus as defined in claim 9 wherein said modes of operation include a mode in which said first and second sources of inflation fluid are actuated simultaneously, and further include a mode in which said first and second sources of inflation fluid are actuated sequentially.

11. Apparatus as defined in claim 9 wherein said first source of inflation fluid includes a plurality of grains of ignitable gas generating material which, when ignited, generates gas for inflating the vehicle occupant restraint, said second source of inflation fluid also including a plurality of grains of said gas generating material, the number of grains of said gas generating material included in said second source of inflation fluid differing from the number of grains of said generating material included in said first source of inflation fluid.

12. Apparatus as defined in claim 9 wherein said first and second sources of inflation fluid are included in a larger plurality of sources of inflation fluid, each of said sources of inflation fluid, when actuated, providing a respective volume of inflation fluid which differs from each other respective volume of inflation fluid.

13. Apparatus as defined in claim 1 wherein said position sensor means comprises a sensor for detecting a relative position of a seat within the vehicle and said position signal is indicative of the relative position of an occupant within the vehicle.

14. Apparatus as defined in claim 9 wherein said position sensor means comprises a sensor for detecting a relative position of a seat within the vehicle and said position signal is indicative of a the relative position of an occupant within the vehicle.

* * * * *